United States Patent
Yamashita et al.

[19]

[11] Patent Number: 5,959,950
[45] Date of Patent: Sep. 28, 1999

[54] DISK DRIVE CAPABLE OF LOADING A DISK PACKAGE CONTAINING MULTIPLE DISKS OF DIFFERENT TYPES AND LOCKING MECHANISM DEPENDENT ON INDIVIDUAL DISK TYPE

[75] Inventors: Tatsumaro Yamashita; Kenji Abe, both of Miyagi-ken, Japan

[73] Assignee: Alps Electric Co., Ltd., Tokyo, Japan

[ * ] Notice: This patent is subject to a terminal disclaimer.

[21] Appl. No.: 08/933,478

[22] Filed: Sep. 18, 1997

[30] Foreign Application Priority Data

Sep. 25, 1996 [JP] Japan ................................ 8-252905

[51] Int. Cl.$^6$ ............................................ G11B 17/22
[52] U.S. Cl. ............................................. 369/36; 369/39
[58] Field of Search ................................ 369/36, 34, 39, 369/178, 75.1, 75.2

[56] References Cited

U.S. PATENT DOCUMENTS

| | | | |
|---|---|---|---|
| 5,117,409 | 5/1992 | Shimizu et al. | 369/36 |
| 5,136,563 | 8/1992 | Takemase et al | 369/36 |
| 5,481,512 | 1/1996 | Morioka et al. | 369/36 |
| 5,574,705 | 11/1996 | Suzuki | 369/36 |
| 5,638,347 | 6/1997 | Baca et al. | 369/34 |

FOREIGN PATENT DOCUMENTS

| | | |
|---|---|---|
| 7-21722 | 1/1995 | Japan . |
| 8-212667 | 8/1996 | Japan . |

*Primary Examiner*—Stuart S. Levy
*Assistant Examiner*—Kenneth Fields
*Attorney, Agent, or Firm*—Brinks Hofer Gilson & Lione

[57] ABSTRACT

Unlike conventional disk drives, a disk drive of the invention is capable of loading a plurality of different types of disks at the same time, and has the capability of protecting a disk sensitive to contamination, such as a RAM disk, from contamination. A plurality of trays are placed in a disk package which is loaded into a disk drive. Different types of disks may be placed on the respective trays. In the package, there is provided a first locking mechanism for locking all trays. This first locking mechanism can be unlocked by a manual operation. There is also provided a second locking mechanism which locks only those trays on which RAM disks or the like are placed so that the RAM disks are prevented from being taken out. In the main unit of the disk drive, there is provided an unlocking member for unlocking both the first and second locking mechanisms.

5 Claims, 11 Drawing Sheets

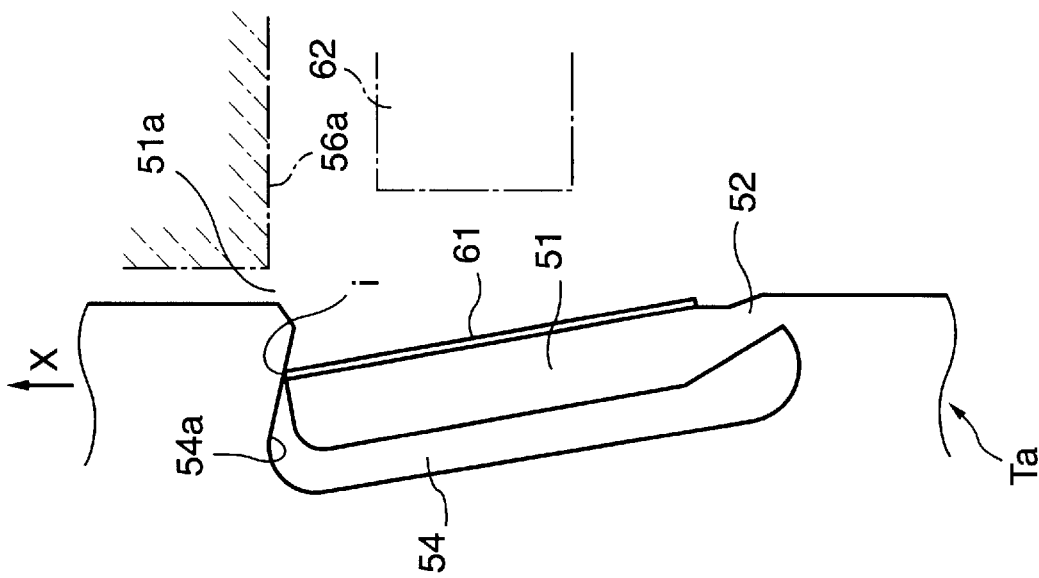
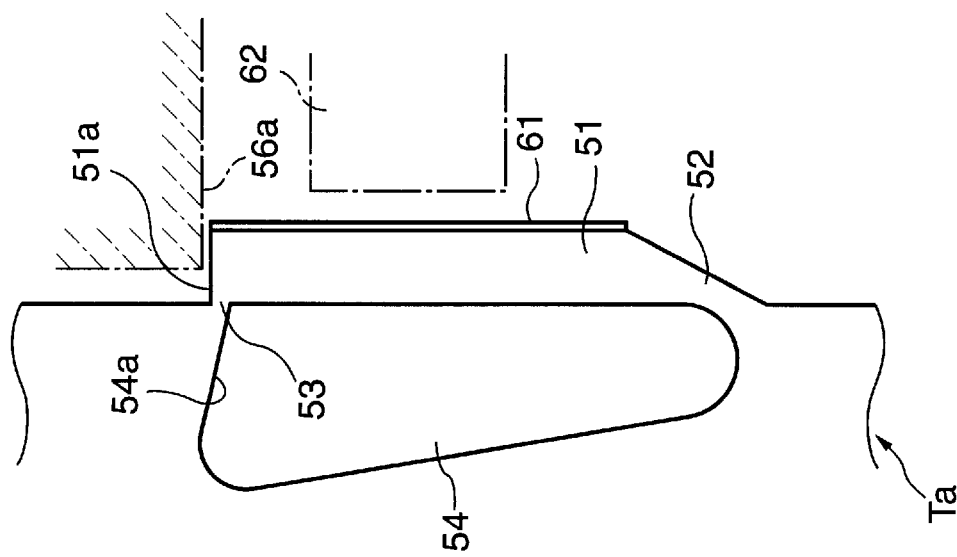

DISK DRIVE CAPABLE OF LOADING A DISK PACKAGE CONTAINING MULTIPLE DISKS OF DIFFERENT TYPES AND LOCKING MECHANISM DEPENDENT ON INDIVIDUAL DISK TYPE

BACKGROUND OF THE INVENTION

1. Field of the Invention

The present invention relates to a disk drive for use in a personal computer or an audio system, capable of loading a disk package containing, in the inside thereof, a mixture of different types of disks such as a CD, CD-ROM, DVD, PD, etc., and driving a selected disk drawn from the disk package.

2. Description of the Related Art

A variety of optical disk media have been proposed. They include: a bit modulation optical disk such as a CD (Compact Disk), CD-ROM (CD Read Only Memory), and a CD-R (CD-Rewritable) which can be written once; a writable/readable optical disk based on phase change such as a PD (Power Disk); and a magneto-optical writable/readable disk such as an MO (Magneto-Optical memory) and HS (Hyper Storage), Furthermore, a DVD-ROM (Digital Versatile Disk ROM) based on the bit modulation technique is known to have a large capacity and is used in audio systems, video systems, and computer systems. A DVD-RAM (DVD-Random Access Memory) is a writable/readable disk based on the phase change technique. An MD (Mini Disk) is a small-sized magneto-optical disk and is used in audio and computer systems.

A variety of disk drives for driving such disks are available. A disk drive adapted to load one disk of a particular type is widely used. Another type of drive such as that known as a CD changer has the capability of loading a plurality of disks of the same type and driving a desired disk selected from the plurality of those disks.

Furthermore, a disk drive has been proposed recently which is adapted to accommodate both CD and DVD and is capable of driving whichever type of disk a user loads.

In the disk drives adapted to handle different types of disks, however, only one disk, for example either a CD or a DVD, can be loaded at a time. No disk drive is known which can load different types of disks at the same time. In particular, no disk drive is known which can load, at the same time, a plurality of disks including both read-only type and writable type disks, such as a combination of a CD-ROM and a DVD-RAM or a combination of a DVD-ROM and a DVD-RAM. Optical disk media will be used in a wider variety of fashions with the increasing variety of computer software and with the increasing data size required in various applications. Thus, there is a great need for a disk drive capable of loading different types of disks at the same time.

One known CD changer has a plurality of slidable trays disposed in the inside of a magazine. After loading disks on the respective trays, if the magazine is placed in a disk drive, a desired tray in the magazine is selected and drawn out. In the majority of conventional CD changers, however, each tray is lightly held by means of a spring or the like so that trays do not drop out of the magazine when the magazine is taken out of the disk drive. If the magazine constructed in the above-described fashion encounters a physical shock when it is held by a hand or in a similar situation, an undesirable ejection of a tray from the case can occur, and a disk may drop from the tray.

Read-only disks such as a CD and VD-ROM have a high resistance to contamination on a surface facing an optical head, caused by for example touch of a finger. Such contamination does not have a significant effect on the reading reliability. In contrast, writable disks such as a DVD-RAM and PD are sensitive to contamination on the disk surface, and even slight contamination can affect the writing reliability. Therefore, it is required to handle a writable disk with a greater care than a read-only disk. However, no disk drives are known which can protect a writable disk from contamination.

To meet the above requirements, an object of the present invention is to provide a disk drive capable of loading a disk package containing, in its inside, different types of disks and also having the locking capability for preventing the disks from moving out of the disk package when the disk package is taken out of the main part of the disk drive.

SUMMARY OF THE INVENTION

According to an aspect of the present invention, there is provided a disk drive adapted to load a disk package, the disk package comprising: a case capable of being loaded into a main part of the disk drive; a plurality of trays which are placed in the case in such a manner that the trays may be individually drawn out from the case, wherein a plurality of disks of two or more different types may be placed on the respective trays; a first locking mechanism for locking all trays in the case; a second locking mechanism for locking only particular trays on which a predetermined type of disk is placed while the other trays are not locked by the second locking mechanism; and a lock releasing element for releasing the lock of the first locking mechanism when the disk package is in the outside of said main part of the disk drive;

wherein the disk drive comprises: a lock releasing member for releasing the first and second locking mechanisms, the lock releasing member being disposed in a loading region in which the disk package is loaded; drawing means for selecting an unlocked tray and drawing the selected tray from the case; and disk driving means for driving a disk placed on the tray drawn out.

Preferably, the disk drive further comprises detection means for detecting, from the main part of the disk drive, the difference in tray structure in terms of whether trays are latched or not by the second locking mechanism, thereby identifying whether a writable disk or a read-only disk is placed on each tray.

In the disk drive of the present invention, a writable disk may be placed on each tray which is locked by the second locking mechanism, and a read-only disk may be placed on each tray which is not locked by the second locking mechanism.

The disk package which is loaded in the disk drive according to the present invention may contain at least two or more different types of disks such as a CD and a DVD-RAM, CD-ROM and a DVD-RAM, and any other combination. These disk are placed at predetermined locations in a case. Preferably, packages containing disks placed at predetermined locations are supplied to a market. Alternatively, packages consisting of trays and a case having the first and second locking mechanisms and having no disks loaded inside may be supplied to a market. In this case, users may load their own disks on the trays of packages. Such a disk package including only a case and trays also falls within the scope of the present invention.

The types of data recorded on disks disposed in one package may be combined in many ways. For example, a combination of a computer operation system and a few application software programs, a combination of music data and video data, a combination of various game software programs, a combination of various materials such as an encyclopedia, dictionary, etc., are possible. More preferably, read-only disks (ROM disks) and writable disks (RAM disks) are mixed into a single package. If ROM and RAM disks are mixed into a single package, it is possible to use the package as a private library storage device capable of using both commercial software and personal data and software.

The disk package according to the invention has the first locking mechanism for locking all trays at fixed locations so that any tray cannot be moved outward from the case. Therefore, when the disk package is taken out from the disk drive, no trays can accidentally move outward from the case even when a mechanical shock is applied to the case, and thus all disks are protected.

When the disk package is in the outside of the disk drive, if a lock releasing element is pressed to release the first locking mechanism, it becomes possible to take trays out of the case. In this state, however, trays on which a particular type of disk is placed are still locked by the second locking mechanism so that they cannot be taken out. For example, in the case of computer software, disks storing an operating system and basic programs, which are not needed to be exchanged, are placed on trays which are prohibited to be taken out, and disks storing application software are placed on trays which are allowed to be taken out. This prevents the operating system and the basic programs from encountering a careless exchange, which would cause the computer to become impossible to start. It is also desirable that RAM disks be placed on trays which are prohibited to be taken out. This prevents the surface of the RAM disks from being contaminated by a touch of a finger.

Preferably, each tray prohibited to be taken out has a deformable latch which is locked by the second locking mechanism so that when it is required to take the tray, which is prohibited to be taken out in a normally state, out of the case, it becomes possible to take it out from the case by deforming the latch. Once the latch is deformed, the tray becomes no longer possible to be locked by the second locking mechanism. If it is desired to further use this tray, a ROM disk or the like which is expected to be exchanged may be placed on the tray.

Furthermore, it is also desirable that trays which are locked by the second locking mechanism and tray which are not locked by the second locking mechanism have different tray structure so that the main part of the disk drive can easily identify the type of trays on the basis of the difference in the tray structure.

Preferably, the lock releasing member of the second locking mechanism is exposed via a small-sized hole of the case so that the second locking mechanism is not easily released accidentally. This prevents the trays which are prohibited to be taken out from being taken out by mistake when the disk package is in the outside of the disk drive.

BRIEF DESCRIPTION OF THE DRAWING

FIGS. 6A and 6B show a schematic diagram illustrating identification means provided on the case of the disk package and also illustrating detection means for accessing the identification means wherein FIG. 6A is an enlarged cross-sectional view taken along line VIA—VIA of FIG. 5, and FIG. 6B is a circuit diagram associated with it;

FIGS. 7A and 7B show a schematic diagram illustrating identification means provided on each tray in the disk package and also illustrating detection means for accessing these identification means wherein FIG. 7A is a partial perspective view and FIG. 7B is a partial plan view;

FIGS. 11A and 11B are enlarged plan views illustrating the positional relationship between the second locking mechanism and a tray on which a RAM disk is placed, for different two states.

DESCRIPTION OF THE PREFERRED EMBODIMENTS

Figure 1:
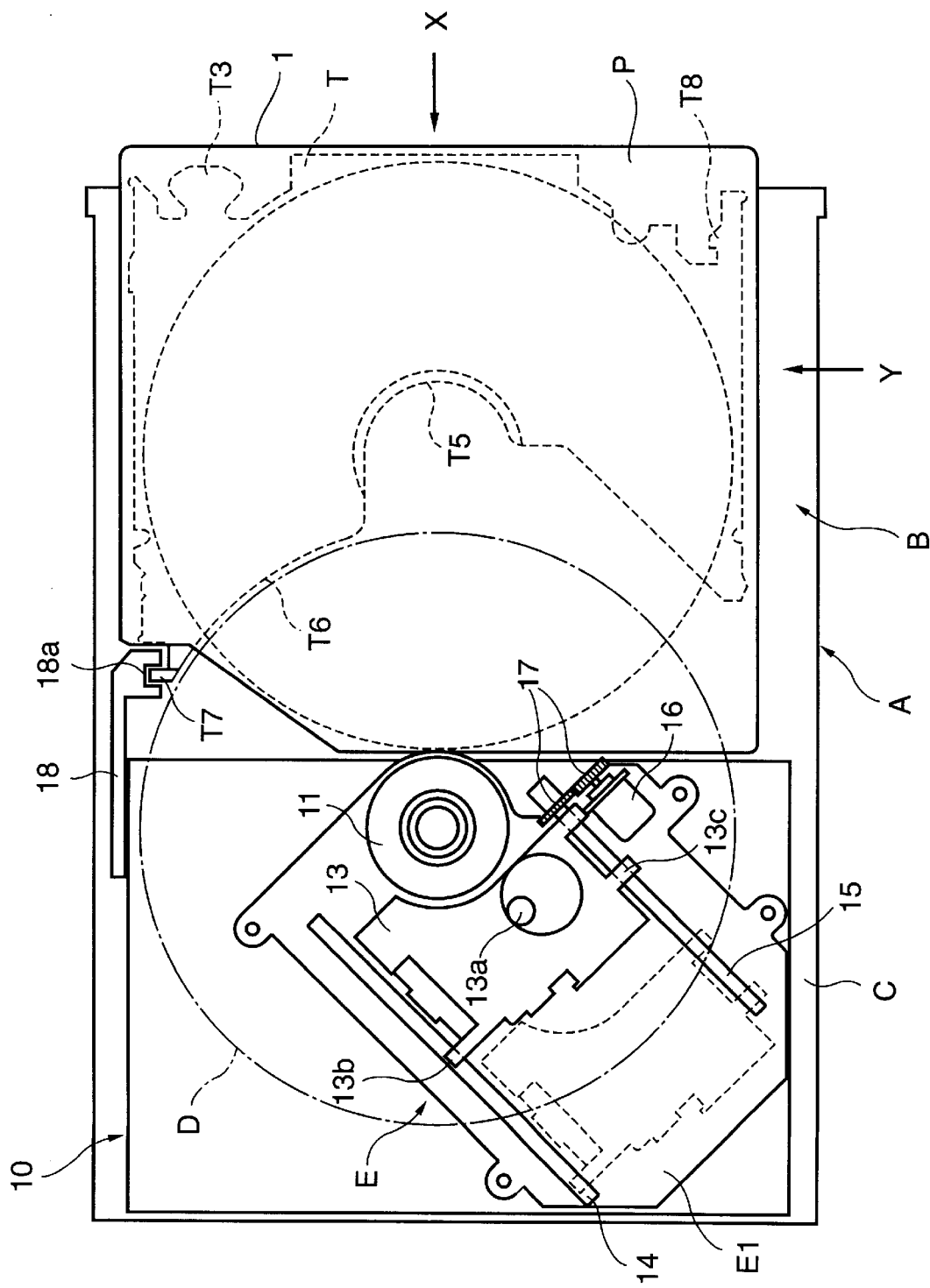
FIG. 1 is a plane cross-sectional view illustrating a disk drive according to the present invention.
Figure 2:
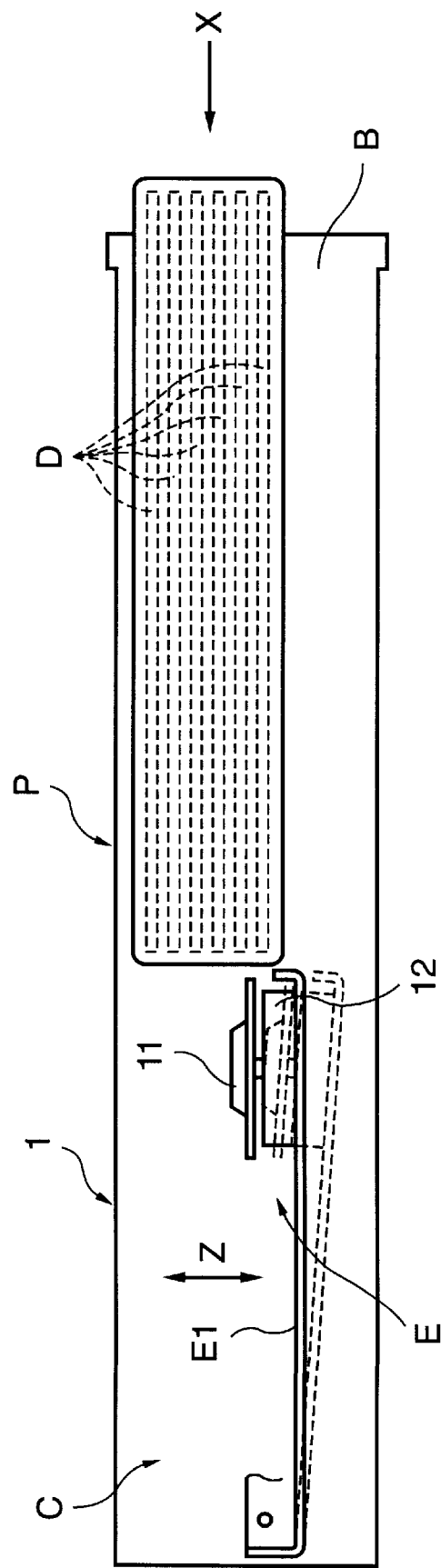
FIG. 2 is a longitudinal cross-sectional view of the disk drive shown in FIG. 1.
Figure 3:
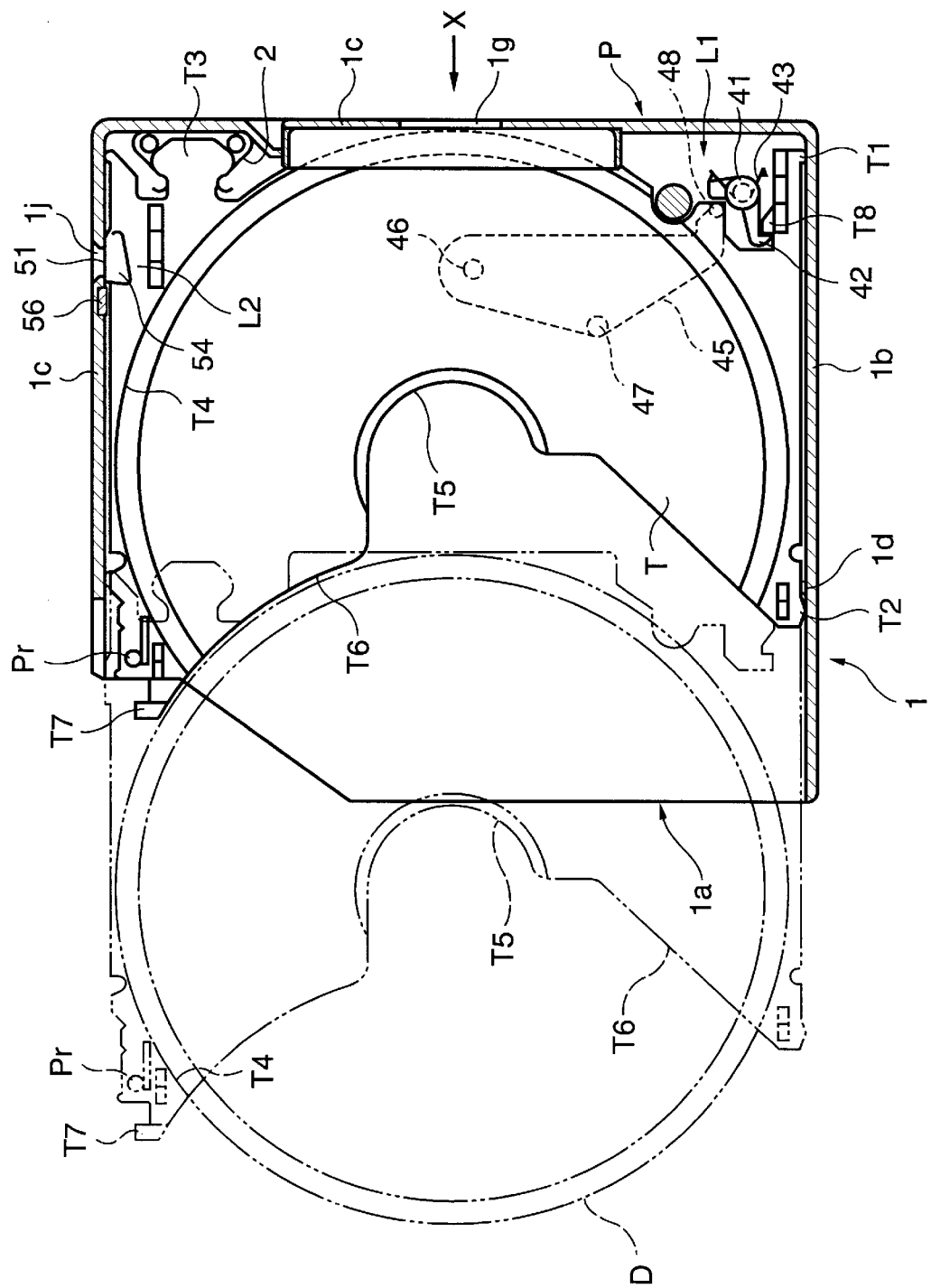
FIG. 3 is a plane cross-sectional view of a disk package loaded in the disk drive.
Figure 4:
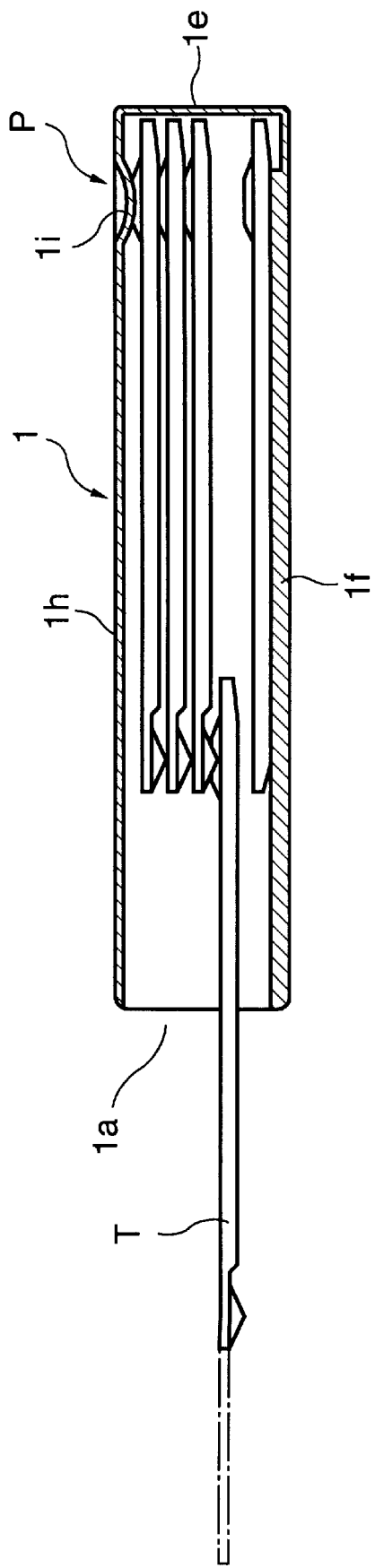
FIG. 4 is a longitudinal cross-sectional view of the disk package shown in FIG. 3.
Figure 5:
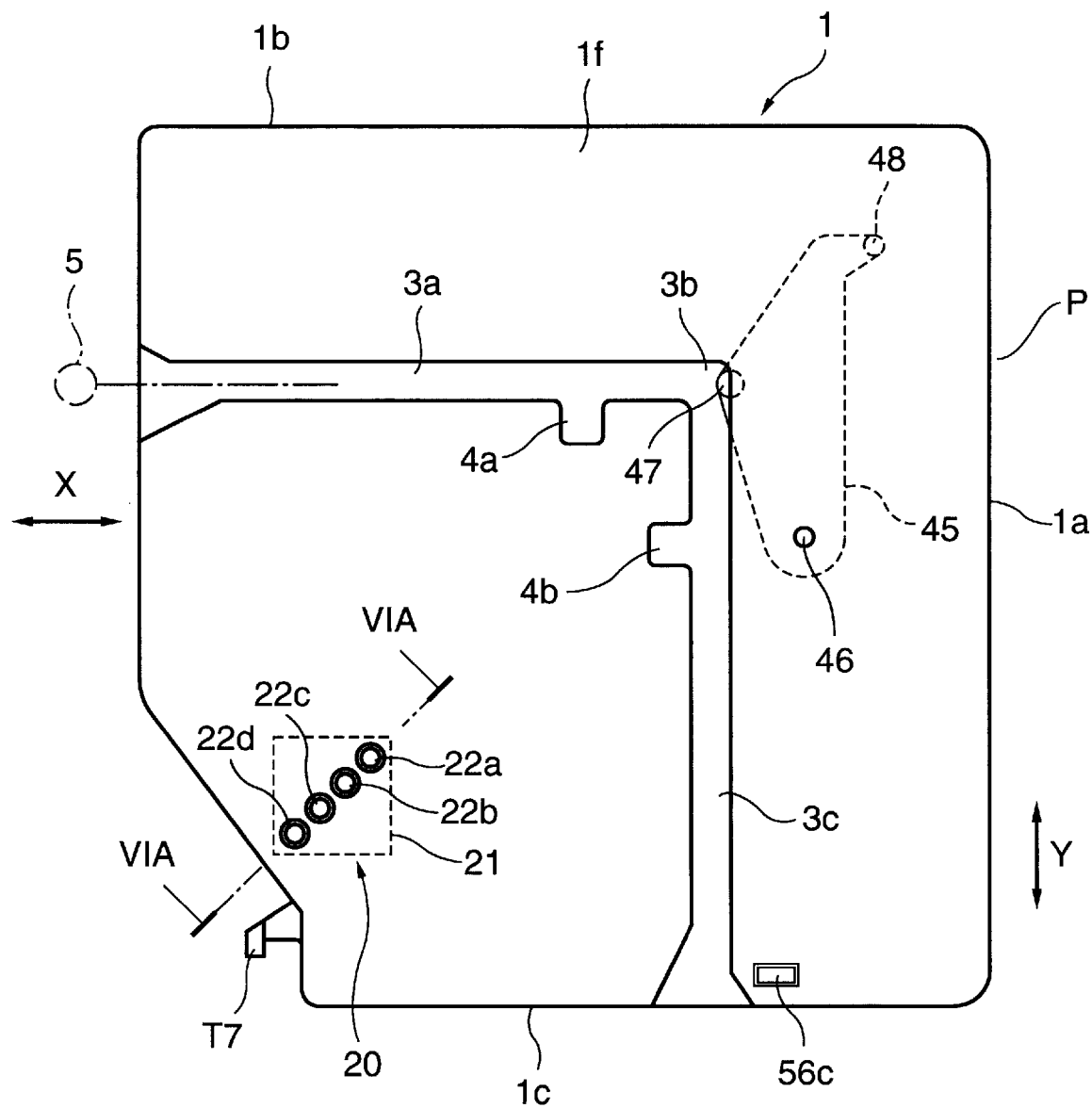
FIG. 5 is a bottom view of the disk package.

FIG. 1 is a plane cross-sectional view illustrating an example of a disk drive adapted to load a disk package. FIG. 2 is a longitudinal cross-sectional view of FIG. 1. FIG. 3 is a plane cross-sectional view of the disk package. FIG. 4 is a longitudinal cross-sectional view of FIG. 3. FIG. 5 is a bottom view of the disk package. The details of various parts of the disk package and the disk drive are shown in FIG. 6 and figures following that.

Outline of Disk Package

Referring to FIGS. 1 and 2, the disk drive has an enclosure A having a rectangular shape in horizontal cross section. Inside the enclosure A, there are a package loading region B in which a disk package P is loaded and a disk driving region C in which disk driving means E for driving a disk D drawn out from the disk package P is disposed.

The disk package P is loaded into the enclosure A of the disk drive by inserting it so that the longitudinal direction of the disk package becomes parallel to the X direction shown in FIGS. 1 and 2.

The disk package P can accommodate a plurality of disks with a diameter of 12 cm or 8 cm. A mixture of read-only disks (ROM disks) and writable RAM disks can be loaded into the disk package P. Representative examples of ROM disks include a CD and DVD-ROM, and representative examples of RAM disks include a PD and DVD-RAM. An example of a disk with a diameter of 8 cm is a single CD. The disk package P has a case 1 made up of a synthetic resin. The case 1 has an opening 1a formed on an end shown on the left of FIGS. 3 and 4 so that a tray T and a disk D can be drawn via the opening 1a.

A plurality of trays T are disposed inside the case 1 in such a manner that they can be freely drawn out. In the specific example shown in the figures, the case 1 can load five trays T. A plurality of horizontal ribs (not shown) protrude from the inner walls of a right side plate 1b and a left side plate 1c of the case 1 so that right and left side faces of each tray T are guided by the horizontal ribs when each tray T is slid in the X direction. As shown in FIG. 3, a limiter projection T1 is formed at a right end on one side face (lower side face in FIG. 3) of each tray T and a limiter projection T2 are formed at a left end. At a location between the limiter projections T1 and T2, a stopper projection 1d is formed in an integral fashion on the inner wall of the left side plate 1b of the case 1. In FIG. 3, a holding projection T3 is formed in an integral fashion on the right end of each tray T. Furthermore, a flat spring 2 for holding the tray T in cooperation with the holding projection T3 is disposed on the inner wall of the front panel 1e of the case 1 wherein the front panel 1 is shown on the right of FIG. 3.

As represented by a solid line in FIG. 3, when trays T are placed in the case 1, the holding projection T3 of each tray T is held by the flat spring 2 so that the trays T cannot move toward the outside via the opening 1a and so that the trays are held firmly without looseness. If a tray T is drawn to the left in FIG. 3 via the opening 1a, the holding projection T3 is released from the flat spring 2 and it becomes possible to further draw the tray T via the opening 1a. When the tray T is drawn by a predetermined distance, the limiter projection T1 formed on the back end of the tray T comes in contact with the stopper projection 1d of the case 1. This is the extreme position and the tray T cannot be drawn further.

In FIG. 3, the chain line represents a tray T drawn from the case 1 to the extreme position. In FIG. 4, a tray T at the fourth level counted from the top level is at the extremely drawn position. If a tray T is forced to be drawn further from the case 1, the limiter projection T1 and its adjacent part are elastically deformed and the limiter projection T1 goes beyond the stopper protection 1d. Thus, it becomes possible to take the tray T1 out of the case 1.

As shown in FIG. 3, a recess T4 is formed on the upper surface of each tray T so that a disk with a diameter of 12 cm can be placed in the recess T4. A semicircular hole T5 is formed in the tray T at the center of the recess T4 so that the center hole of a disk D is exposed downward via the semicircular hole T5. As shown in FIG. 3, an arc-shaped cutout T6 is formed in the left portion of each tray T in such a manner that the cutout T6 extends from the semicircular hole T5. When a tray T is drawn to the position represented by the chain line in FIG. 3, the periphery of a disk placed in the recess T4 of the tray T drawn comes to a location outside the cutout T6 of another tray T located at an adjacent higher level. When the tray T is located at the drawn-out position denoted by the chain line in FIG. 3, the disk D can be rotated at a slightly raised position from the tray T without having a contact between the disk D and the tray T located at the adjacent higher level. That is, in this specific example, the tray T is drawn to the outer position where the center hole of the disk comes outside the case 1 and the disk D on the tray T can be rotated while the disk D partly remains inside the case 1.

When a small-sized disk having a diameter of 8 cm is used, a tray T dedicated for the small-sized disk is placed at any level in the case 1. The tray T for the small-sized disk has a recess T4 having a diameter corresponding to the size of the 8-cm disk. Except for the size of the recess T4, the tray T4 for the small-sized disk is similar to that for a 12-cm disk.

As shown on the left of FIG. 3, each tray T has a hook used to draw the tray T toward the main part of the disk drive.

As shown in FIG. 5, a guide groove 3a extending in the X direction is formed on the bottom plate 1f of the case 1 of the disk package P. At the bottom of the loading region B of the disk drive shown in FIGS. 1 and 2, a guide projection 5 corresponding to the guide groove 3a so that the guide projection 5 can move along the guide groove 3a with substantially no looseness. When the disk package P is inserted in the X direction into the loading region B, the guide projection 5 is fitted into the guide groove 3a formed on the bottom plate if and the guide groove slides relative to the guide projection 5. When the end 3b of the guide groove 3a extending in the X direction comes in contact with the guide projection 5, the loading of the disk package P is complete. In this state, a lock member (not shown) provided in the loading region B in the enclosure A is fitted into the lock groove 4a formed in the guide groove 3a described above thereby locking the disk package P.

In the disk drive shown in FIG. 1, the disk package P is loaded in the X direction. However, the disk drive may also be constructed so that the disk package P is loaded in the Y direction. In this case, the disk package P may be of the same type. That is, as shown in FIG. 5, a guide groove 3c is formed in the Y direction on the bottom plate 1f of the case 1 and a lock groove 4b is formed in the middle of the guide groove 3c. In the case where the disk package P is loaded in the Y direction, the guide groove 3c extending in the Y direction slides relative to the guide projection 5 disposed in the loading region B.

Construction of Disk Drive

In the disk drive shown in FIGS. 1 and 2, a movable selection base 10 is disposed in the disk driving region C in the enclosure A. An up-and-down driving mechanism is disposed in the enclosure so that the movable selection base 10 is moved up and down by the up-and-down driving mechanism in the direction (Z direction) perpendicular to the levels of trays T. Thus, a desired tray T is selected from those loaded in the disk package P by properly controlling the motion and position of the up-and-down driving mechanism in the Z direction.

The disk driving means E described above is mounted on the movable selection base 10. The disk driving means E includes a turn table 11 disposed on a driving base 1e, for holding the center hole of a disk D, and a spindle motor 12 for driving the turn table 11 so as to rotate it. The disk driving means E also includes a guide shaft 14 extending in a radial direction of the disk D and a driving screw shaft 15 extending in a direction parallel to the guide shaft 14. A bearing element 13b of an optical head 13 is supported by the guide shaft 14 in such a manner that the bearing element 13b can slide along the guide shaft 14. A female thread 13c of the optical head 13 meshes with the driving screw shaft 15. The optical head 13 includes, in its inside, a light emitting element such as a laser diode, a photodetector for detecting the light reflected from the disk, and other optical elements such as a beam splitter. The optical head 13 also includes an objective lens 13a facing the recording surface of the disk D.

The optical head 13 is capable of reading different types of disks D such as a CD and a DVD. To this end, the focal length of the objective lens 13a can be switched between two values.

The disk driving means E has a sled motor 16 disposed on the driving base E1 and the driving force generated by the sled motor 16 is transferred to the driving screw shaft 15 via a set of gears 17. The optical head 13 is moved in a radial direction of the disk D by the rotational driving force of the driving screw shaft 15.

Although the disk drive shown in FIG. 1 is designed to serve as a read-only drive, the disk drive may also be constructed to have writing capability by employing disk driving means E having writing capability. For example, when a writable disk D of the magneto-optical type is used, a magnetic head is disposed above the objective lens 13a in such a manner that the disk D can be located between the objective lens 13a and the magnetic head.

The movable selection base 10 with the disk driving means E mounted thereon moves up and down in the Z direction to a position corresponding to a desired tray T to be selected in the disk package P. When the movable selection base 10 is at rest in front of the selected tray T, the driving base E1 on the movable selection base 10 is pivoted between a horizontal position represented by a solid line in FIG. 2 and a slanted position represented by a broken line. In the specific example shown in FIG. 2, the movable selection base 10 is at rest at a location corresponding to a tray T at the second level counted from the bottom, and the driving base E1 is pivoted to the slanted position represented by the broken line before the tray T is drawn. After the tray T is drawn out, the driving base E1 is returned to the horizontal position and the turn table 11 is fitted into the center hole of the disk D. The disk D is slightly moved upward relative to the tray T, and the disk D is clamped between the turn table 11 and a clamping member (not shown). Then the disk D is rotated.

As shown in FIG. 1, there is disposed a drawing lever 18 serving as drawing means at the side of the movable selection base 10. The drawing lever 18 moves together with the movable selection base 10 up and down in the Z direction, and is driven to the left in the figure by a drawing driving mechanism disposed on the movable selection base 10. When the movable selection base 10 is at the lowest position in the enclosure A, the drawing lever 18 is off the hook T7 of any tray. When the movable selection base 10 comes to a location corresponding to a tray T to be selected, a recess 18a of the drawing lever 18 may receive the hook T7 of the selected tray T. For example, in FIG. 2, when the movable selection base 10 is at rest at a location corresponding to the second tray T counted from the bottom, the recess 18a of the drawing lever 18 moves to a position corresponding to the hook T7 of the second tray T counted from the bottom. After that, if the drawing lever 18 is driven to the left in FIG. 2, the selected tray T is drawn by the drawing lever 18 into the disk driving means E.

Disk Type Identifying Means

The disk package P describe above includes, in its inside, at least two or more different types of disks. The disk package P has identifying means for identifying the type of disks.

The trays T are made up of a synthetic resin with a color which varies depending on the type of the disk mounted on each tray. For example, a tray T on which a CD is mounted has a gray color, a tray T for a DVD-ROM has a blue color, a tray T for a PD has a red color, a tray T for a DVD-RAM has a green color, and so on. Such the color identification makes it possible for a user to identify the difference between RAM disks and ROM disks by means of visual observation and also the difference in recording scheme between disks. If it is desired, only two colors may be employed to identify trays for RAM disks and trays for ROM disks.

In the case of the disk package P shown in FIG. 3, the color of each tray T can be identified by means of visual observation via the opening 1a of the case 1. In FIG. 3, an open window 1g is formed in the right side plate of the case 1, that is the front panel 1e which can be viewed from the front side of the disk drive when the disk package P is at a loaded position, wherein a transparent panel is embedded in the window 1g. Therefore, when the disk package P is at the loaded position in the disk drive, a user can identify the color of the trays T in the case 1 by viewing the inside via the window 1g formed in the front panel 1e.

Furthermore, as shown in FIG. 5, identification means 20 indicating the type of the disk disposed in the case 1 is formed on the bottom plate 1f of the case 1 in the disk package P.

Figure 6A:
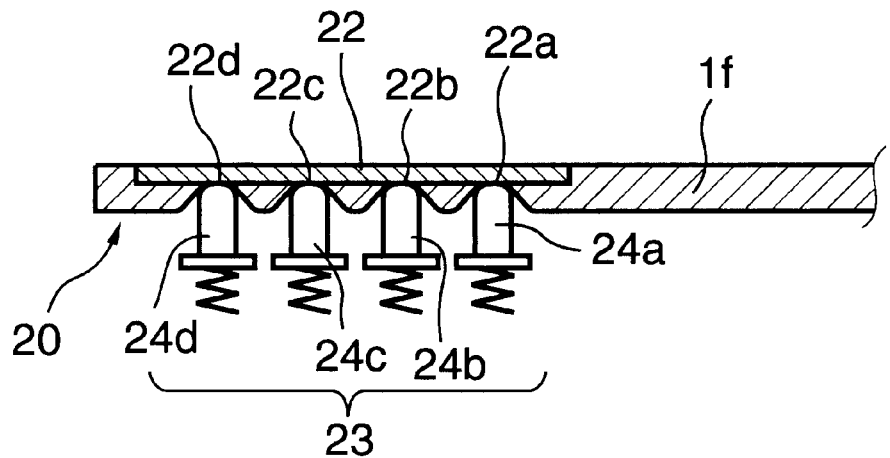
Figure 6B:
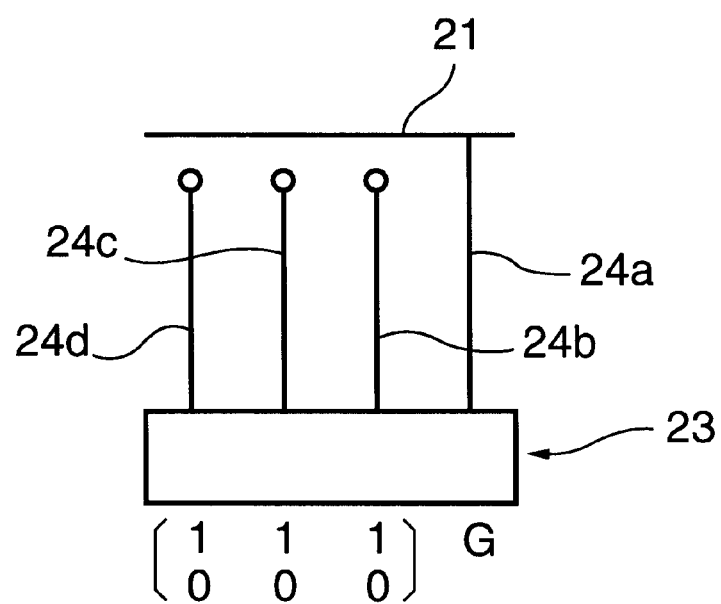

FIG. 6A is an enlarged cross-sectional view of the identification means 20, taken along line VIA—VIA of FIG. 5. FIG. 6B is a circuit diagram of the identification means 20.

The identification means 20 includes: a jumper card 21 embedded in the bottom plate 1f of the case 1; and four identification holes 22a, 22b, 22c, and 22d which are either opened so that they are connected to the jumper card 21 or closed. Detection means 23 for accessing the identification means 20 is formed in the loading region B in the enclosure A of the disk drive. The detection means 23 includes detection pins 24a, 24b, 24c, and 24d corresponding to the identification holes 22a, 22b, 22c, and 22d, respectively. When the disk package P is loaded in the loading region B, the respective detection pins 24a, 24b, 24c, and 24d are pushed by spring force against the corresponding identification holes 22a, 22b, 22c, and 22d.

Of the detection pins, one pin 24a serves as a ground pin (maintained at a ground potential). Identification is performed by detecting whether the ground pin 24a is electrically connected to other detection pins 24b, 24c, and 24d. The detection pin 24a serving as the ground pin is always electrically connected to the jumper card 21 via the identification hole 22a. On the other hand, the other identification holes 22b, 22c, and 22d are opened or closed depending on the information to be transmitted. For example, if the identification hole 22b is open, the detection pin 24b is electrically connected to the jumper card 21 and thus the detection pin 24a is electrically connected to the detection pin 24b. Herein this state is represented by "1", while the state in which the identification hole 22b is closed and thus the detection pins 24a and 24b are not connected to each other is represented by "0". Since there are three identification holes in addition to the ground pin, it is possible to obtain 3-bit information (8 different kinds of information) when the detection means 23 accesses the identification means 20 from the enclosure A (the main unit of the disk drive).

From the 3-bit identification information described above, the main unit of the disk drive can identify the types of the disks D loaded at the respective levels in the disk package P. That is, it is possible to know at which levels RAM disks are loaded and at which levels ROM disks are loaded. Furthermore, the main unit of the disk drive can know the combination of types associated with the five disks. If the number of identification holes is increased, the main unit can identify more identification information.

The identification means 20 for providing a few bits of identification information may also be realized in a different manner without using the jumper card 21. For example, a plurality of reflecting sheets are provided on the outer surface of the case 1 and a photo reflector, which supplies a light ray toward the reflecting sheets and which detects the light reflected from the reflecting sheets, is provided in the main unit of the disk drive so that the main unit can obtain identification information associated with the disks loaded in the disk package P, depending on whether the reflecting sheets are provided or not at the respective bit positions, or whether light is reflected or not from the respective bit positions.

Another manner of realizing the identification means 20 is to employ a memory device such as an IC card embedded in the case 1 whereby identification information is obtained by accessing the IC card via contacts disposed in the enclosure A. If the IC card or the like is employed, the unit in the case 1 can hold more information. This makes it possible to supply not only information about the types of disks loaded in the case 1 but also other information such as an index of information recorded on each disk, TOC data, etc., to the main unit of the disk drive.

Figure 7A:
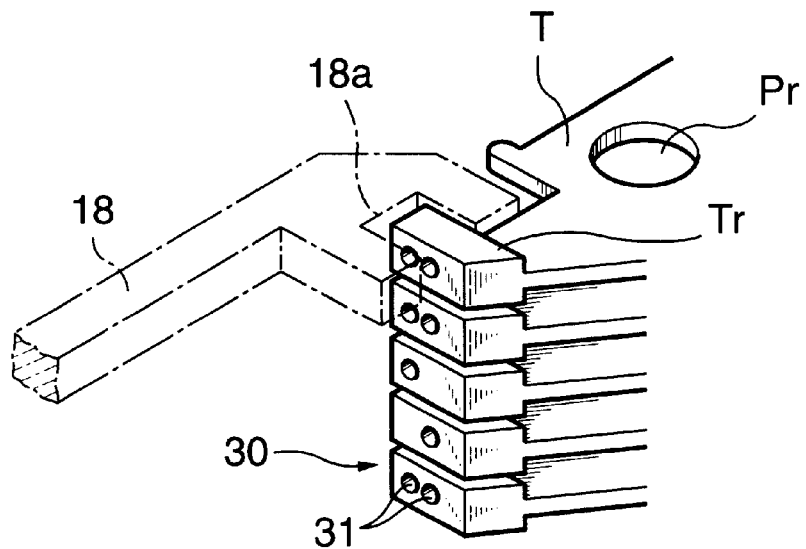
Figure 7B:
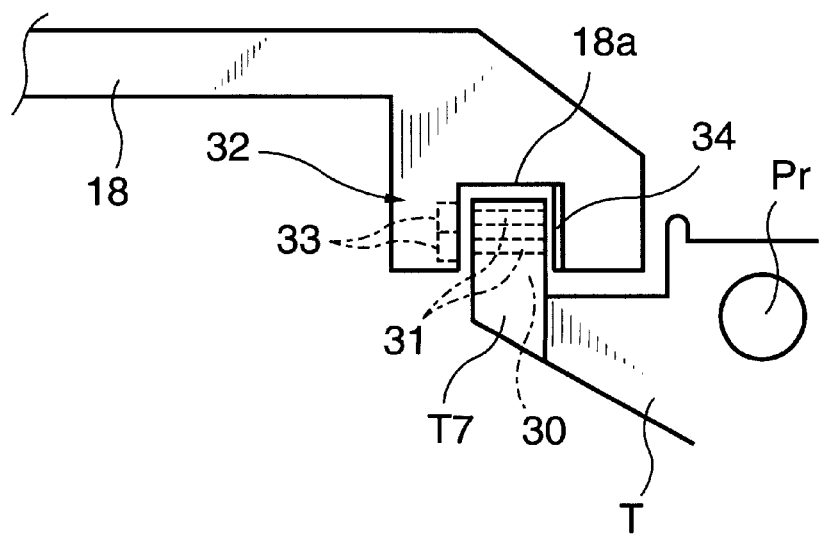

FIG. 7 illustrates another example of identification means. In this example, each tray T loaded in the case 1 has its own identification means 30. FIG. 7A is a perspective view illustrating the identification means provided on each tray T and also detection means provided in the main unit of the disk drive. FIG. 7B is a plan view of FIG. 7A.

The identification means 30 is disposed on the hook T7 of each tray T. The identification means 30 has 2-bit identification holes 31 formed in the hook T7 of each tray. In the main unit of the disk drive, on the other hand, detection means 32 is disposed on the drawing lever 18 disposed on the movable selection base 10. The detection means 32 includes: two photo reflectors 33 formed on one inner wall of the recess 18a; and a reflecting sheet (reflecting surface) 34 formed on the other inner wall. The identification holes 31 can provide identification information depending on whether the respective identification holes 31 are open or closed. When an identification hole 31 is open, a detection light ray emitted by the photo reflector 33 is passed through the open identification hole 31, and is reflected by the reflecting sheet 34. The reflected light is detected by the photo reflector 33. Thus, information of "1" or "0" can be given by each identification hole 31 depending on whether the identification hole 31 is open or closed. In the specific example shown in FIG. 7, each tray T7 has two identification hole 31, and thus each tray T7 can hold 2-bit information. From this 2-bit information, it is possible to identify the type of the disk loaded on that tray T. For example, it is possible to identify whether the disk loaded on the tray T is a ROM disk or a RAM disk. Furthermore, it is also possible to identify the recording scheme of the disk.

In the example shown in FIG. 7, the detection means 32 for accessing the identification means 30 is provided on the drawing lever 18 in the main unit of the disk drive wherein the drawing lever 18 is movable together with the movable selection base 10 in the Z direction in FIG. 2. Immediately after loading the disk package P into the enclosure A, the movable selection base 10 is moved in the Z direction so that the detection means 32 provided on the drawing base 18 comes to a position corresponding to the identification means 30 of one tray T then to another position corresponding to another tray T, and so on. The disk drive has means for detecting the vertical position of the movable selection base 10 and thus it is possible to identify which tray's identification means 30 the detection means 32 is facing. On the basis of the information about the position of the movable selection base 10 and also on the basis of the 2-bit information detected by the detection means 32, the main unit of the disk drive can obtain the identification information associated with each disk in loaded in the disk package P immediately after the disk package P is loaded.

The identification means 30 provided on each tray T is not limited to the above-described type in which presence/absence of identification holes 31 is detected. Instead, for example, reflecting sheets may be attached to each tray T, in a proper area thereof, and a photo reflector capable of facing the reflecting sheets may be provided on the movable selection base 10 so that disk identification information is obtained by detecting whether the reflecting sheets are attached to the tray T. Another technique of realizing the identification means 30 is to detect the presence/absence of identification projections formed on each tray T by detecting whether switches provided on the movable selection base 10 are activated or not by the identification projections.

Only either one of the identification means 20 provided on the case 1 shown in FIG. 5 or the identification means 30 provided on each tray T may be employed, or both may be used.

Furthermore, identification information obtained by reading the TOC data from the disk D and/or by detecting the track pitch of the disk D via the optical head 13 may also be used together with the identification information obtained by the identification means 20 provided on the case 1 and/or the identification means 30 provided on each tray T. If the identification information obtained from the case and/or the tray is coupled with the identification information obtained by directly accessing the disk via the optical head 13, it becomes possible to identify the type of the disk in a more reliable fashion. This can prevent, for example, a ROM disk from being incorrectly identified as a RAM disk, which would cause the ROM disk to be damaged by laser power applied to the recording surface of the ROM disk, and thus preventing the information recorded on the ROM disk from being lost by such the incorrect identification.

As shown in FIG. 3, a write protecting plate Pr is formed in the inside of the hook T7 of the tray T. This write protecting plate Pr may be formed only on such trays on which a RAM disk is loaded. The write protecting plate Pr may be realized by forming a thinned part at a proper location of the tray. In the case where the disk drive is of the writable type, when a tray T is drawn out by the disk driving means E to a location where the tray T is driven, a detector comes to a location corresponding to the write protecting plate Pr. The detector comprises a light emitting device disposed at one side of the write protecting plate Pr and a photodetector disposed at the other side of the write protecting plate Pr. If the write protecting plate Pr remains on the tray without being removed, the light emitted from the light emitting device is blocked by the write protecting plate Pr, and thus the photodetector detects no light. In this case, the detector concludes that the RAM disk is in a writable state. If the write protecting plate Pr is removed thereby forming a through-hole, the photodetector detects light. In this case, the detector concludes that the RAM disk is in a state in which writing is not allowed.

As described above, means for identifying whether it is allowed or not to write information onto a disk placed on a tray can be provided on the tray on which the disk is loaded.

Locking Mechanism of Disk Package

Figure 8:
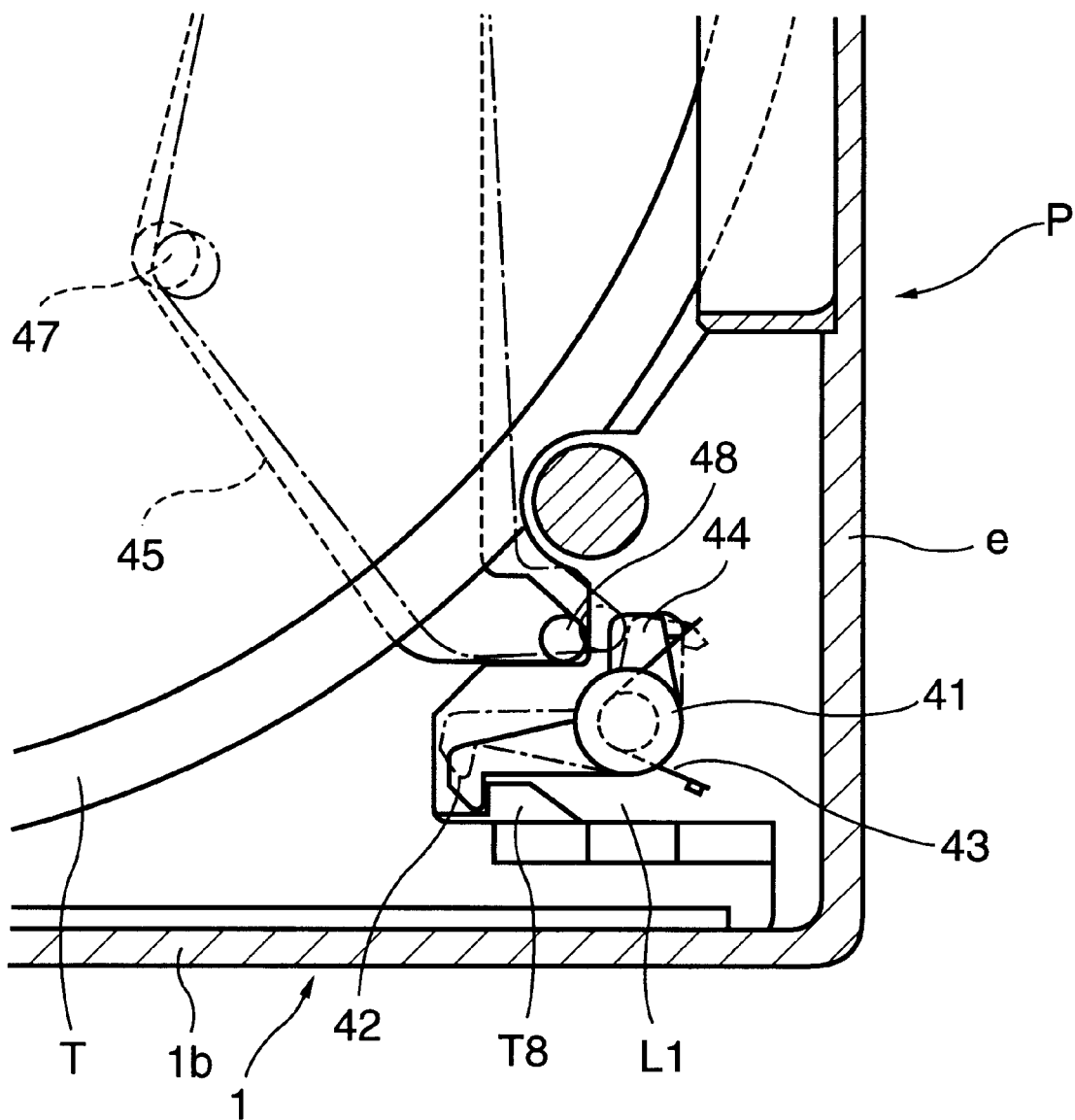
FIG. 8 is a partial plan cross-sectional view illustrating a first locking mechanism provided in the disk package.
Figure 9:
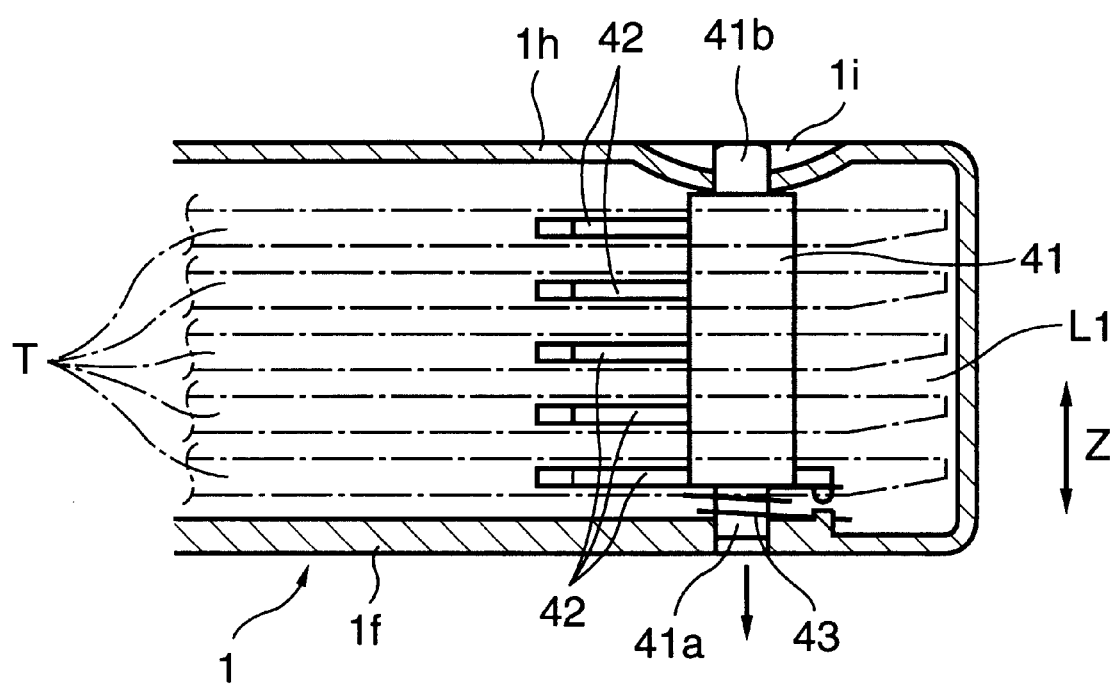
FIG. 9 is a longitudinal cross-sectional view of FIG. 8.

The disk package P shown in FIGS. 8 and 9 has a first locking mechanism L1 for preventing all the trays T from accidentally moving outward from the disk package P when the disk package P is taken out from the disk drive, and also has a second locking mechanism L2 for preventing those trays T on which a RAM disk is loaded from being taken out when the first locking mechanism L1 is unlocked, while the other trays are allowed to be taken out. This protection of the trays on which a RAM disk is loaded from being taken out from the disk package prevents the recording surface of the RAM disks from being accidentally contaminated or damaged when the disk package P is taken out from the disk drive.

FIG. 8 is a partial plane cross-sectional view illustrating the first locking mechanism provided on the disk package P. FIG. 9 is a longitudinal sectional view illustrating the same part as that shown in FIG. 8.

A locking shaft 41 is disposed in the case 1 of the disk package P. The locking shaft 41 has a small-diameter shaft 41a formed in an integral fashion at its lower end wherein the small-diameter shaft 41 extends through the lower plate 1f of the case 1. The locking shaft 41 also has another small-diameter shaft 41b formed in an integral fashion at its upper end, wherein the small-diameter shaft 41b extends through the upper plate of the case 1 and reaches a recess 1i formed on the outer surface 1h of the upper plate of the case 1. In this structure, the locking shaft 41 can rotate freely and also can slide downward along the Z axis from the position shown in FIG. 9. As shown in FIG. 9, a helical torsion coil spring 43 is disposed around the lower small-diameter shaft 41a so that the locking shaft 41 is urged in a counterclockwise direction in the plane cross-sectional view of FIG. 8 by means of the elastic force of the helical torsion coil spring 43. Furthermore, the locking shaft 41 is also urged upward in FIG. 9 by this helical torsion coil spring 43. Thus, the small-diameter shaft 41b formed on the upper end of the locking shaft 41 projects upward into the recess 1i formed on the upper surface 1h of the case 1 so that the upper small-diameter shaft 41b acts as unlocking means.

The locking shaft 41 has five locking claw hooks (locking elements) 42 spaced uniformly and formed in an integral fashion. Each tray T loaded in the case 1 has an integrally-formed latching protrusion T8 corresponding to the locking claw hook. The locking shaft 41 also has a pushed-projection 44 formed in an integral fashion and projecting toward the inner part of the case 1.

As shown in FIG. 3 and 8, an unlocking lever 45 serving as an unlocking member for releasing the lock of the first locking mechanism L1 is formed on the inner surface of the bottom plate 1f of the case 1. The unlocking lever 45 is pivotably supported by a supporting pin 46 formed on the inner surface of the bottom plate 1f. Furthermore, the unlocking lever 45 is urged in a clockwise direction in FIG. 3 or 8 by a spring member (not shown). A pushing part 48 is formed at an end of the unlocking lever 45 so that the pushing part 48 faces the pushed-projection 44 formed on the locking shaft 41.

At the middle of the periphery of the unlocking lever 45, a projection 47 is formed in an integral fashion. As shown in FIG. 5, the projection 47 partly extends into the common end of the guide groove 3a extending in the X direction and of the guide groove 3c extending in the Y direction.

When no disk package P is loaded in the disk drive, the locking shaft 41 is moved upward along the Z axis by the helical torsion coil spring 43 as shown in FIG. 9, and furthermore the locking shaft 41 is rotated in the counterclockwise direction by the helical torsion coil spring 43 as shown in FIG. 8. In this state, each locking claw hook 42 extending from the locking shaft 41 meets the latching projection T8 formed on each tray T in the case T1 and all the trays T are locked so that no tray T can move outward from the case 1.

If the disk package P is inserted in the X direction into the loading region B in the enclosure A, the guide groove 3a shown in FIG. 5 slides relative to the guide projection 5 formed in the enclosure A. When the disk package P is fully inserted into the loading region B, a locking mechanism (not shown) is fitted into the locking groove 4a and thus the case 1 is locked. At this stage, the guide projection 5 reaches the end of the guide groove 3a and the projection 47 is pushed by the guide projection 5. When the disk package P is loaded in the Y direction into the disk drive, the projection 47 is also pushed by the guide projection 5 which reaches the end 3b of the guide groove 3c.

When the protection 47 is pushed by the guide projection 5, the unlocking lever 45 is pivoted in the counterclockwise direction in FIG. 3 or 8 (in the clockwise direction in the bottom view of FIG. 5). Thus, the pushed-projection 44 is pushed by the pushing part 48 formed in an integral fashion at the end of the unlocking lever 45. As a result, the locking shaft 41 rotates in the clockwise direction in FIG. 8, and thus the locking claw hooks 42 are released from the corresponding latching projections T8 of the respective trays T.

That is, when the disk package P is taken out of the disk drive, all the trays T are locked by the locking claw hooks 42 so that any tray T cannot move outward from the disk package P. On the other hand, when the disk package P is loaded into the loading region B in the enclosure A, the locking by means of the first locking mechanism L1 is released for all the trays T.

When the disk package P is in the outside of the disk drive, if the small-diameter shaft 41b projecting into the recess 1i formed on the upper surface of the case 1 is pressed with a finger, the locking shaft 41 slides downward along the Z axis against the elastic force of the helical torsion coil spring 43. As a result, the locking claw hooks 42 formed in the integral fashion on the locking shaft 41 each come to a location between a tray T and an adjacent tray T and thus the locking clay hooks 42 are all released from the corresponding latching projections T8 of the respective trays. Thus, the locking by means of the first locking mechanism L1 is released for all the trays T.

Figure 10:
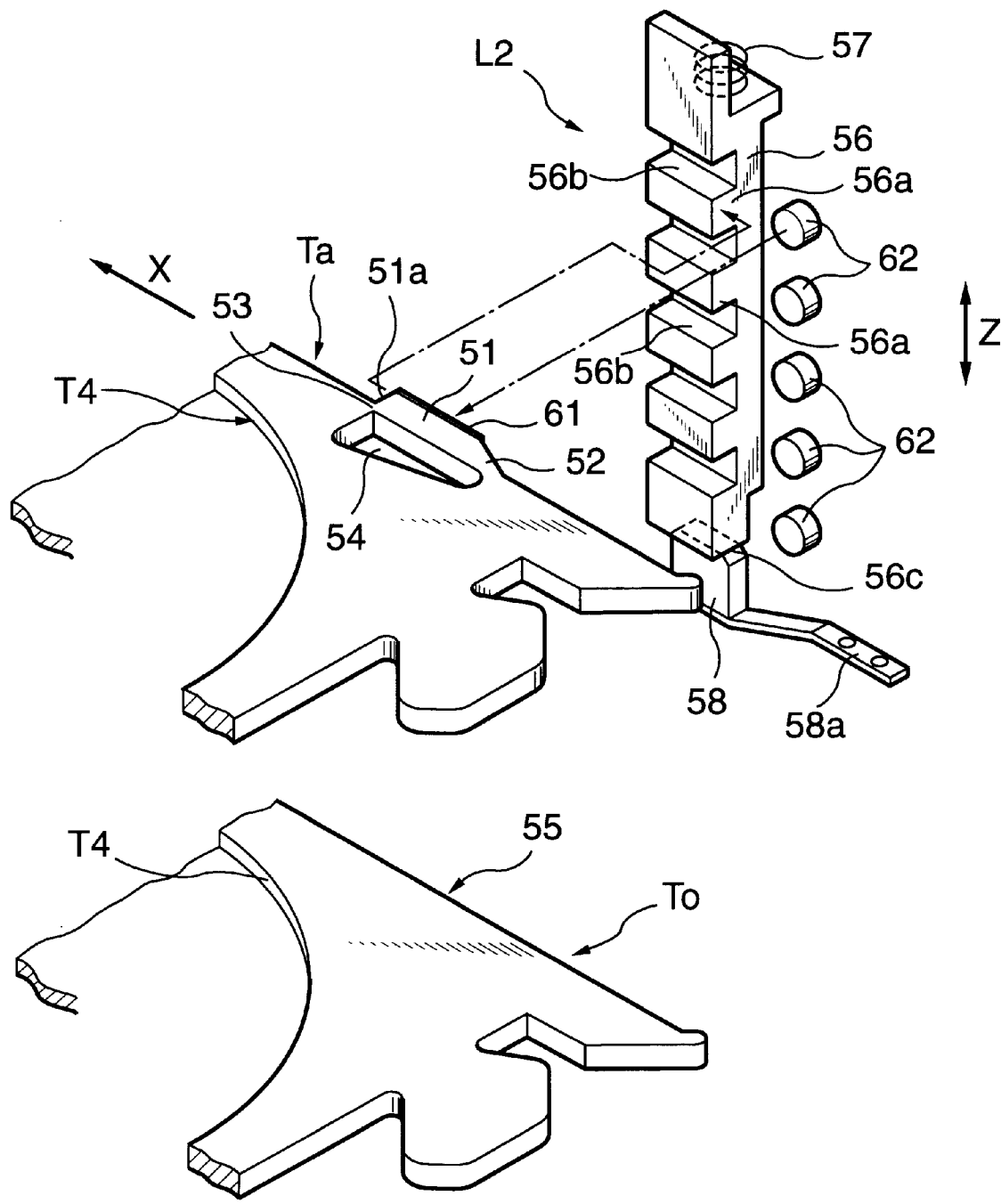
FIG. 10 is a partial exploded perspective view illustrating the structure of a second locking mechanism provided in the disk package.

FIG. 10 is a fragmentary exploded perspective view illustrating the structure of the second locking mechanism L2. FIGS. 11A and 11B are enlarged plan views illustrating the positional relationship between the second locking mechanism L2 and a tray on which a RAM disk is placed, for different two states.

The second locking mechanism L2 serves to lock only the trays T on which RAM disks are loaded. In FIG. 10, a tray used for a RAM disk is denoted by Ta and a tray used for a ROM disk is denoted by To.

A projection 51 is formed on the side face, shown at the right side the X axis in FIG. 10, of the RAM disk tray Ta. The tray Ta has an opening 54 formed at the inner side of the projection 51. The projection 51 is connected to the main part of the tray Ta via a thin-walled deformable part 52 and also via a separable thin-walled part 53. The projection 51 has an end face in the X direction, which serves as a latching surface 51a. The projection 51 and the latching surface 51a make up a latch which is latched by the second latching mechanism L2.

On the other hand, the ROM disk tray To has no projection 51 and its right side end 55 is formed into a flat shape.

A locking member 56 is disposed between the bottom plate 1f and the upper surface of the case 1 of the disk package P and within the wall thickness of the right side plate 1c wherein the locking member 56 is supported in such a manner that it can slide in the Z direction (up and down). Furthermore, as shown in FIG. 10, the upper end of the locking member 56 is pressed downward by an urging spring 57 so that the locking member 56 is moved downward along the Z axis by means of the elastic force of the urging spring 57.

The locking member 56 has locking parts 56a and unlocking parts 56 which are alternately disposed in the Z direction. The unlocking parts 56b are made up by forming grooves at proper intervals. The locking parts 56a are formed at the same intervals in the Z direction as the intervals at which the trays T are disposed.

When the disk package P is in the outside of the disk drive, the locking member 56 is urged downward in FIG. 10 and is located at the lowest position. Therefore, the locking parts 56a face in the X direction against the latching surfaces 51a of the respective RAM disk trays Ta and the locking parts 56a latch the corresponding latching surfaces 51a. When the disk package P is loaded in the loading region B of the disk drive, the bottom face 56c of the locking member 56 exposed via the bottom plate 1f of the case 1 (refer to FIG. 5) is pushed by an unlocking member 58 (refer to FIG. 10)

disposed in the enclosure A, and thus the locking member 56 is slightly moved upward along the Z axis so that the unlocking parts 56b come to the locations in front of the corresponding latching surfaces 51a of the RAM disk trays Ta.

As shown in FIG. 5, the unlocking member 58 is in contact with the small-area bottom face 56c of the locking member 56 and the bottom face 56c is pushed into the case 1 by the unlocking member 58 which is urged in the pushing direction by a flat spring 58a. Alternatively, the unlocking member 58 may be driven in the pushing direction described above by a mechanical driving force.

In the second locking mechanism L2, as described above, when the disk package P is in the outside of the disk drive, the locking parts 56a of the locking member 56 come to the locations in front of the latching surfaces 51a of the trays Ta on which a RAM disk is loaded and the locking parts 56a latch the latching surfaces 51a thereby locking the trays Ta so that no trays Ta cannot be moved outward from the case 1. However, because the trays To on which a ROM disk is loaded have no projection 51, these trays To are not locked by the second locking mechanism L2. When the disk package P is fully loaded in the loading region B in the enclosure A, the locking member 56 is pushed upward by the unlocking member 58 disposed in the loading region B and thus the unlocking parts 56b of the locking member 56 come to the location in front of the corresponding latching surfaces 51a. Thus, the RAM disk trays Ta are unlocked.

As described above, when the disk package P is loaded in the disk drive, both the first locking mechanism L1 and the second locking mechanism L2 are released, and thus it is possible to draw any desired tray into the disk driving means E.

When the disk package P is in the outside of the disk drive, all trays are locked by the first locking mechanism L1 while the second locking mechanism L2 locks only the RAM disk trays Ta. In this state, if the first locking mechanism L1 is released by pressing, with a finger, the small-diameter shaft 41b formed at the upper end of the locking shaft 41 shown in FIG. 9, the ROM disk trays To become no longer locked by any locking mechanism, while the RAM disk trays Ta are still locked by the second locking mechanism L2. Therefore, it becomes possible to take any ROM disk tray out of the case to exchange the disk D. Since the RAM disk trays Ta are still locked and thus they cannot be taken out of the case 1, the recording surfaces of the RAM disks are prevented from being contaminated and thus the RAM disks are perfectly protected.

In the first locking mechanism L1, the small-diameter shaft 41b projects into the outside via the upper surface 1h of the case 1 so that a user can press it with his/her finger. In contrast, the locking member 56 of the second locking mechanism L2 is small in cross section and the area of the bottom face 56c (refer to FIG. 5) of the locking member 56 exposed via a small hole 1k formed in the bottom plate if of the case 1 is so small that the user cannot press the bottom face 56c with his/her finger when the disk package P is in the outside of the disk drive thereby ensuring that the second locking mechanism L2 cannot easily released by hand.

Furthermore, as shown in FIG. 3, the right side plate 1c of the disk package P has a plurality of open slits 1j and the projections 51 of the respective RAM disk trays Ta are exposed via these slits 1j. When the disk package P is in the outside of the disk drive, if a tool such as a screw-driver is inserted into some slit 1j, the projection 51 formed on the side face of the corresponding tray Ta is pushed by the screw-driver, and the thin-walled part 53 is separated. As a result, the thin-walled part 53 is deformed and the projection 51 is moved into the hole 54. As shown in FIGS. 11A and 11B, the inner wall 54a at the front of the hole 54 seen in the X direction is curved downward (in the opposite direction to the X direction) with the position to the right. The projection 51 bent into the hole 54 is latched by the inner wall 54a at a location i as shown in Fig. 11B. Thus, the projection 51 fully sinks into the hole 54 and it cannot move outward from the hole 54.

In the state shown in FIG. 11B, the latching surface 51a at the end of the projection 51 is no longer in contact with the locking part 56a of the locking member 56, and therefore the RAM disk tray Ta is released from the lock of the second locking mechanism L2. As described above, when the disk package P is in the outside of the disk drive, if the first locking mechanism L1 is released by pressing the small-diameter shaft 41b, the projection 51 is sunk into the hole as shown in Fig. 11B and thus it becomes possible to take the RAM disk tray out of the case 1. In this state, it is possible to remove the RAM disk from the tray.

Once the projection 51 of the tray Ta is sunk into the hole, the projection 51 can no longer return to the original position. Therefore, the tray Ta with the sunk projection 51 can no longer be used as a RAM disk tray. If it is desired to further use this tray, the tray can be used only as a ROM disk tray.

Furthermore, using the projection 51 of the RAM disk tray Ta, it is also possible to detect the type of the tray (whether a RAM disk or another type of disk is loaded on the tray). For example, a reflecting sheet 61 is attached to the side face of the projection 51, and photo reflectors 62 serving as detection means are disposed in the enclosure A in such a manner that when the disk package P is loaded, the photo reflectors 62 face the respective slits 1i formed in the right side plate 1c of the case 1.

When the disk package P is loaded in the enclosure A, if some photo reflector 62 detects light reflected from some reflecting sheet 61, it can be concluded that there is a tray Ta on which a RAM disk is loaded. When the projection 51 of some RAM disk tray Ta is sunk into the hole as shown in FIG. 11b and the tray Ta has become no longer able to be used as a RAM disk tray, the reflecting sheet 61 may be removed and the tray may be used as a ROM disk tray. Alternatively, when the projection 51 is sunk into the hole as shown in FIG. 11B, the corresponding reflector 62 may be changed in orientation so that the reflector 62 no longer receives the light reflected from the reflecting sheet 61 attached to the surface of the projection 51.

In the disk drive according to the present invention, as describe above, a disk package which can accommodate a mixture of two or more different types disks such as a RAM disk and a ROM disk can be loaded, and it is possible to select any desired disk and drive it. The disk package can be used as a high-capacity recording medium. Furthermore, if a RAM disk is included in the disk package, it is possible to use the package as a private library storage device. When the disk package is in the outside of the disk drive, all trays are locked so that any tray or disk cannot move accidentally out of the case. Furthermore, when the disk package is in the outside of the disk drive, particular disks are prevented from being taken out so that basic disks are not exchanged by mistake. This also prevents RAM disks from being contaminated when they are carelessly taken out.

What is claimed is:

1. A disk drive capable of loading a disk package, said disk package comprising:

a case capable of being loaded into a main part of said disk drive;

a plurality of trays which are placed in said case in such a manner that said trays may be individually drawn out from said case, wherein a plurality of disks of two or more different types may be placed on the respective trays, said plurality of trays including a first type of tray wherein a recordable disk is placed and second type of tray wherein a read-only disk is placed;

a first locking mechanism for locking all trays in said case;

a second locking mechanism for locking only particular trays on which a predetermined type of disk is placed while the other trays are not locked by said second locking mechanism; and a lock releasing element for releasing the lock of said first locking mechanism when said disk package is in the outside of said main part of said disk drive;

wherein only said first type of tray comprise an engaging portion, said engaging portion engageable with a locking member of said second locking mechanism for locking said first type of tray; and said disk drive comprising:
  a lock releasing member for releasing said first and second locking mechanisms, said lock releasing member being disposed in a loading region in which said disk package is loaded;
  drawing means for selecting an unlocked tray and drawing the selected tray from the case; and
  disk driving means for driving a disk placed on said tray drawn out.

2. A disk drive according to claim 1, further comprising detection means for detecting, from the main part of said disk drive, the type of disk disposed in each said tray, said detection means including means for determination whether or not trays are latched by said second locking mechanism.

3. A disk drive according to claim 1, wherein a writable disk is placed on each tray which is locked by said second locking mechanism, and a read-only disk is placed on each tray which is not locked by said second locking mechanism.

4. A disk package according to claim 1, wherein said first locking mechanism includes an unlocking operating portion operable by means of said lock releasing member included in said loading region of said disk package, for insertion of said disk package in two orthagonal directions.

5. A disk package according to claim 1, wherein said second locking mechanism includes a locking member, said locking member comprising a plurality of locking parts projecting from said locking member, each locking part corresponding with a respective tray in said plurality of trays, and said locking parts engagable with said engaging portions of said first type of trays for locking each of said first type of trays.

* * * * *